United States Patent
Haegel et al.

[11] Patent Number: 5,833,756
[45] Date of Patent: *Nov. 10, 1998

[54] PROCESS AND PLANT FOR DECONTAMINATING SOLID MATERIALS CONTAMINATED WITH ORGANIC POLLUTANTS

[75] Inventors: Franz-Hubert Haegel, Düren; Wolfgang Clemens, Bedburg; Milan Schwuger, Haan; Carl-Johannes Soeder, Dortmund, all of Germany; Katrin Stickdorn, Brussels, Belgium; Leslie Webb, Düren-Echtz, Germany

[73] Assignee: Forschungszentrum Julich GmbH, Julich, Germany

[*] Notice: This patent issued on a continued prosecution application filed under 37 CFR 1.53(d), and is subject to the twenty year patent term provisions of 35 U.S.C. 154(a)(2).

[21] Appl. No.: 705,060

[22] Filed: Aug. 29, 1996

Related U.S. Application Data

[63] Continuation of Ser. No. 387,840, filed as PCT/DE93/00792, Aug. 23, 1993 published as WO94/04289, Mar. 3, 1994, abandoned.

[30] Foreign Application Priority Data

Aug. 22, 1992 [DE] Germany ................. 42 27 962.3

[51] Int. Cl.⁶ ................................................. B08B 3/08
[52] U.S. Cl. ........................ 134/10; 134/25.1; 134/26; 134/40
[58] Field of Search ............... 134/10, 25.1, 26, 134/40

[56] References Cited

U.S. PATENT DOCUMENTS

| | | | |
|---|---|---|---|
| 4,952,315 | 8/1990 | Saab | 210/610 |
| 5,126,073 | 6/1992 | Saab | 252/353 |
| 5,223,147 | 6/1993 | Rosenstock et al. | 210/705 |

FOREIGN PATENT DOCUMENTS

| | | |
|---|---|---|
| 0432651 | 6/1991 | European Pat. Off. |
| 3815309 | 11/1988 | Germany |
| 3915930 | 11/1990 | Germany |
| WO 90/06795 | 6/1990 | WIPO |
| WO91/11543 | 8/1991 | WIPO |

OTHER PUBLICATIONS

Chemical Abstracts, vol. 99, No. 20, 14 Nov. 1983, Columbus, Ohio, US; abstract no. 161055 F, J. Desnoyers 'Tar sand extractions with microemulsions. The dispersion of bitumen in microemulsions' p. 146.

Canadian Journal of Chemical Engineering, vol. 61, pp. 680–688 (1983).

*Primary Examiner*—Zeinab El-Arini
*Attorney, Agent, or Firm*—Herbert Dubno; Jonathan Myers

[57] ABSTRACT

A process for decontaminating a solid material contaminated with an organic pollutant wherein the solid material contains grains with a particle size of up to 60 microns, which includes the steps of:

(a) extracting the organic pollutant from the solid material containing grains with the particle size up to 60 microns by using a microemulsion which includes a thermodynamically stable, macroscopically homogeneous and optically transparent mixture of water, an apolar hydrophobic solvent, and a surfactant to form a cleaned solid material and a pollutant-containing microemulsion;

(b) separating the cleaned solid material from the pollutant-containing microemulsion; and (c) splitting the pollutant-containing microemulsion into a surfactant-rich phase and a pollutant-containing phase.

15 Claims, 1 Drawing Sheet

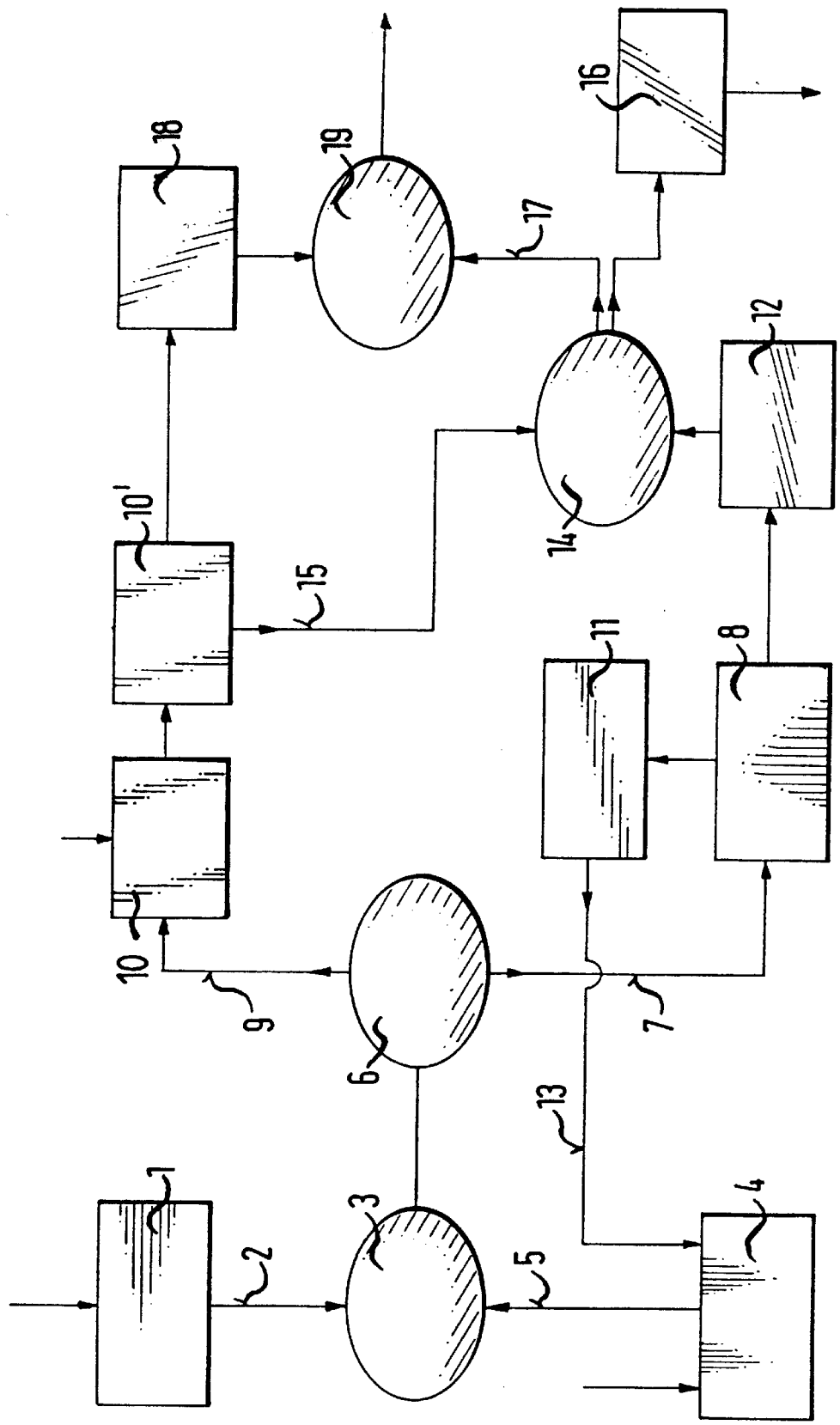

PROCESS AND PLANT FOR DECONTAMINATING SOLID MATERIALS CONTAMINATED WITH ORGANIC POLLUTANTS

CROSS REFERENCE TO RELATED APPLICATION

This is a file-wrapper continuation of application Ser. No. 08/387,840 filed 13 Feb. 1995, now abandoned, which was a national stage application of PCT/DE 93/00772 filed Aug. 23, 1993, published as WO94/04289, Mar. 3, 1994.

FIELD OF THE INVENTION

The invention relates to a process and a plant for the decontamination of solid materials contaminated with organic pollutants, particularly soil contaminated with polycyclic aromatic hydrocarbons.

BACKGROUND OF THE INVENTION

Materials to be disposed of, such as tar pavement waste, street sweepings, sludge, filter dust and light shredder refuse, frequently contain organic pollutants such as polycyclic aromatic hydrocarbons, polychlorinated biphenyls (PCB), dibenzofurans (PCDF) and dioxins (PCDD). They are a source of hazards when disposed of requiring specially equipped waste sites. Therefore the effort is to pretreat the solid materials contaminated with pollutants and to separate these pollutants. A particular case is the decontamination of soil. Due to industrial processes, spills and negligent disposal of materials which contain pollutants, such as unacceptable soil contaminations have occurred locally which now require a cleansing of the soil. The present decontamination techniques used for contaminated soil are not capable of solving all problematic cases in a satisfactory manner. Thus contamination by polycyclic aromatic hydrocarbons can be found mainly in old sites of mineral oil storage tanks, in coking plants, in tar and pitch processing plants, as well as in old waste dumps. Due to their lower solubility in water, their low vapor pressure and their ready adsorption by inorganic and organic materials, the polycyclic aromatic hydrocarbons tend to cling for a long time to the soil layers in the waste site. Polycyclic aromatic hydrocarbons are accumulated especially in fine soil sediments.

Generally in the cleansing of contaminated soil in-situ or ex-situ processes are used. In an in-situ process the soil as such is left at the contaminated site, while all ex-situ processes require the soil to be excavated. Besides in the latter case a difference has to be made between the measures which can be taken at the waste site and those which require transportation to a plant.

For environmental reasons microbiological processes are preferred for the decontamination of polluted soils, whereby improved growth conditions for the natural microorganisms are created by supplying nitrogen or phosphate fertilizers, and primarily by supplying oxygen. Last but not least the microbiological processes are used because of their wide political acceptance. However in certain problem cases they fail. Soils with a high fine-grained content adsorb numerous substances to such a high extent that only very few remain dissolved in the soil-water, and only such dissolved substances are accessible to the microorganisms. Besides certain substances can be degraded only with difficulty or not at all, because they are not easily soluble in water phases or, as in the case of chlorinated hydrocarbons, are barely bio-available, i.e. accessible to microorganisms.

Due to improved growth conditions, microbiological processes are frequently performed on site. For this purpose up to a certain depth the soil is removed and stored in clamps.

Other processes which can be performed on site are physico-chemical soil washing processes.

Basically they rely on a mechanical separation of the pollutants through abrasion. For this purpose the soil particles are moved through the washing solution by applying mechanical energy. The separated pollutants collect at the finer soil fraction, which then finally has to be disposed of or burned as a highly contaminated residue. This process is not suitable for soils rich in clay with a very high fine-grained content.

Sometimes auxiliary substances are added to the soil wash. The addition of vegetable oils serves here for improving the flotation of light hydrophobic organic soil pollutants, such as coal dust. Sometimes surfactants are added in order to obtain better washing results. However, in all washing processes either a highly polluted aqueous phase or a contaminated fine-grained fraction always results.

A particular case among the washing processes is the extraction with overcritical media. However, the use of overcritical water involves considerable energy costs and also leads to a partial destruction of the soil matrix. The results are more favorable when carbon dioxide is used. However until now it has not been possible to reach certain threshold limits in all cases.

All microbiological and physico-chemical processes can be performed also off site. In the case of thermal processes for the destruction of organic pollutants this is the rule. Here it is necessary to make a distinction between pyrolysis and combustion. Soil resulting from a burning installation can not be returned to its initial use. After pyrolysis the soil can be recovered under specific circumstances. However thermal processes are expensive as a rule.

OBJECTS OF THE INVENTION

It is the object of the invention to create a process for the decontamination of solid materials contaminated with organic pollutants, particularly of soil contaminated with polycyclic aromatic hydrocarbons, by means of which a simple and complete removal of the pollutants can be achieved.

SUMMARY OF THE INVENTION

This object of the invention is achieved according to the steps of the new process. According to that the polluted solid material, optionally after crushing and mechanical disaggregation, is mixed with a microemulsion. Microemulsions are thermodynamically stable, macroscopically homogeneous and optically transparent mixtures of water, an apolar hydrophobic solvent (especially oil) and a surfactant. As further components the microemulsions can contain an electrolyte and a cosurfactant, such as aliphatic alcohol. Polar as well as apolar pollutants can be solubilized in microemulsions, the microemulsions have extremely low interfacial tensions and surface tensions. Based on their submicroscopic structure large inner interfaces occur. Contrary to emulsion, microemulsions are thermodynamically stable. When the contaminated solid material is contacted with a microemulsion, the organic pollutants are solubilized in the apolar compartment of the microemulsion, and this way washed out from the solid material.

In the case of the soil the process of the invention distinguishes itself favorably over the previous decontamination concepts based on an abrasion process, essentially due to the genuine dissolving process. During extraction when the contaminated soil is mixed with the microemulsion, the molecules of organic pollutant adhering to the soil particles concentrate in the apolar phase of the microemulsion. This way also soils with a high content of silt and clay can be cleansed. The fine-grained fraction does not have to be separated and disposed as waste, as was previously the case. The pollutants dissolve in the microemulsion, which in a further process step is subsequently separated from the decontaminated solid material by mechanical separating processes. In order to remove the apolar phase carrying the organic substances, the microemulsion is subsequently split into the apolar phase and the surfactant-rich water phase. As a rule this separation can be achieved by purely physical means, such as changes in temperature or pressure. Thereby the surfactant collects in the pollutant free, water-rich phase, while the pollutants are concentrated in the apolar phase.

In a further embodiment of the invention it is proposed to reuse the surfactant-rich water phase for the extraction of the polluted soil.

If the cleansed solid materials, particularly cleansed soil, are supposed to be returned to the environment, it is necessary to use microemulsions consisting of biodegradable components. For the apolar phase vegetable oils are used. As biodegradable surfactants for instance alkyl polyglucosides, alkyl polyglycol ethers or sorbitan esters should be considered, which do not cause long-term changes in the properties of the soil and thereby of the transport of pollutants in the soil. The desired facilitation of the substance transport is therefore mainly effective only during the washing of the solid material. An uncontrolled contamination of the soil receiving the cleansed solid material due to the propagation of pollutant is avoided this way.

For its complete disposal, the contaminated phase of the microemulsion, especially the one containing polycyclic aromatic hydrocarbons, can for instance be burned. However, according to the invention it is proposed to mix the pollutant-carrying phase with microorganisms which decompose the organic compounds. The thereby produced water which is relieved of contamination is removed. Preferred are such microorganisms which are suitable for the inoculation of the cleansed solid material, particularly soil, which is supposed to be recovered and which through the aforedescribed process are adapted to the surfactant, oil and pollutant degradation.

The cleansed solid material is rinsed with water in order to separate the possible microemulsion residues it still contains, and the water-rich rinsing solution is fed to the apolar phase of the microemulsion which is infiltrated with microorganisms and contains polycyclic aromatic hydrocarbons. If soil-adapted microorganisms are used, the cleansed soil to be recovered will be inoculated with them.

BRIEF DESCRIPTION OF THE DRAWING

The process of the invention and a plant suitable for implementing the process are subsequently described in more detail with the aid of embodiment examples.

The drawing shows schematically a flow diagram of a plant for the decontamination of soil contaminated particularly with polycyclic aromatic hydrocarbons. The plant is conceived preferably for an on-site soil processing.

The soil contaminated with polycyclic aromatic hydrocarbons is brought from a storage vessel 1 of solid materials via a feeder 2 to a multiple-stage extraction device 3 where it is mixed with a microemulsion supplied to the extraction device from storage containers 4 for the microemulsion via a supply duct 5. In the extraction device 3 an intensive mixing of the contaminated solid materials with the microemulsion takes place. In the embodiment examples, for the contaminated soil microemulsions are used which contain on the one hand as apolar phase vegetable oils, such as rape seed oil, rape seed oil methyl ester or palm oil, and which contain as a biologically degradable surfactant for instance alkyl polyglycosides based on $C_{12-16}$-alcohol and on $C_{10-16}$-alcohol, or which on the other hand are composed of mineral oils such as isooctane and in addition of nonionic surfactants. During extraction the polycyclic aromatic hydrocarbon compounds concentrate in the apolar oil phase, the soil mixed with the microemulsion becomes freed of polycyclic aromatic hydrocarbons.

From the extraction device 3 the mixture of solid materials, respectively soil and microemulsion is transferred to a separating device 6, wherein the extracted solid material is separated from the microemulsion which is now contaminated with polycyclic aromatic hydrocarbons. The separation can be for instance performed mechanically through sedimentation, filtration or centrifuging. The microemulsion containing the polycyclic aromatic hydrocarbons flows via a microemulsion line duct 7 to phase-separating device 8, while the extracted solid material reaches a rinsing chamber via a conveyor belt 9, and subsequently reaches a further separating device 10'.

In the embodiment example the phase separation for the microemulsion is performed thermally. Through temperature changes the surfactant-rich water phase is expelled and collected in a container 11. The oil phase containing polycyclic aromatic hydrocarbons collects in an oil container 12. In the embodiment example the surfactant-rich water phase is returned from the container 11 to the storage container 4 via a return duct 13. This way almost only biodegradable oil has to be supplied to the storage container 4, the largest portion of the surfactant fraction is run in the decontamination cycle of solid materials.

In order to accomplish the final degradation of the polycyclic aromatic hydrocarbon compounds dissolved in the apolar phase, in the embodiment example a biological decomposition by means of microorganisms takes place. For this purpose the oil phase containing the polycyclic aromatic hydrocarbons is directed from the oil container 12 to the microorganism reactor 14. The microorganisms are adapted to the spectrum of the substances to be degraded and are suitable for soil inoculation. In the embodiment example mixed cultures isolated from the soil and a pure culture of Flavobacterium indologenes are introduced.

The water-rich rinsing solution coming from rinsing chamber 10 and subsequent separating device 10' is also brought into the microorganism reactor 14 via a duct 15 for the rinsing solution, so that microemulsion possibly washed out in rinsing chamber 10 can also be degraded together with the apolar phase containing polycyclic aromatic hydrocarbons. In the microorganism reactor 14 the compounds containing polycyclic aromatic hydrocarbons are converted by the microorganisms, waste water free of polycyclic aromatic hydrocarbons flows into the waste water basin 16.

The microorganisms can be introduced via a duct 17 into the cleansed soil. The soil is taken out of a clamp 18, which serves for the intermediate storage of the soil recovered in the separating device 10'. The inoculation of the soil with microorganisms takes place in an installation 19 suitable for the inoculation. Subsequently the decontaminated soil can be returned to the environment.

In the treatment of solid materials contaminated with organic pollutants, a considerable reduction of the contamination with pollutants is achieved due to the extraction with a microemulsion, containing either mineral or vegetable oils. In the case of solid materials which are supposed to be deposited in waste sites this leads to their classification in lower pollutant classes. When mineral oils are used, these pollutant-loaded liquids can be burned after being separated from the solid material, and suitably also from the surfactants. When biologically degradable surfactants and oils are used, the pollutant-containing phase can be disposed of biologically. In the latter case it becomes possible to return the cleansed solid materials, particularly the cleansed soil, to the environment, special waste sites are not necessary.

The extraction of the solid materials with microemulsions is to be performed in several stages, the solid material to be cleansed is treated in several successive extraction stages. Thereby each time the returned surfactant-rich phase, after being replenished with fresh surfactant and oil fractions, is reintroduced to the same extraction stage. This way the extraction can take place so that several extraction reactors, which are also suitable for the separation of microemulsions after each extraction stage, are alternately filled with the contaminated solid material and for performing the extraction stage are successively operated several times with the microemulsion supplied from storage containers 4. After the last extraction stage the extraction reactor is emptied each time and the solid material is freed of the pollutant-contaminated microemulsion in the separating device 6.

In the subsequently described embodiment examples, for the extraction of a solid material contaminated with polycyclic aromatic hydrocarbons, coming from a soil-washing plant as a fine-grained fraction with particles of a grain size <60 μm and which was contaminated with 570 mg pyrene per kg of solid material, the following ternary mixtures were used as microemulsions:

| Microemulsion a: | |
| --- | --- |
| water | 42% by weight |
| isooctane | 42% by weight |
| surfactant (Igepal CA 520 = octyl-phenol pentaethylene glycol ether) | 16% by weight |
| Microemulsion b: | |
| water | 89% by weight |
| rape seed oil | 1% by weight |
| alkyl polyglycoside (APG) | |
| C12—C16-APG | 6% by weight |
| C10—C—12-APG | 4% by weight |

The solid material was mixed with either microemulsion a or b at 25° C. for 2 hours and extracted and subsequently separated in the pollutant-containing microemulsion through centrifuging at 40,000 g for over two hours. Thereby in the extraction with microemulsion a, 277 mg pyrene per kg of solid material, corresponding to a pollutant decontamination of 49% by weight of solid material, and in the extraction with microemulsion b, 412 mg. pyrene per kg of solid material, corresponding to a pollutant decontamination of 72% by weight was removed. If the extraction is performed in two stages, after the second extraction stage with the same microemulsion b, an additional 88 mg pyrene per kg of solid material is obtained, which corresponds to a further pollutant decontamination by 15% by weight (in relation to the total pollutant load of 570 mg $kg^{-1}$).

The splitting of the microemulsion in a surfactant-rich phase and a pollutant-containing phase occurs already spontaneously during the extraction, if the maximum possible oil amount is solubilized in the microemulsion, because due to the adsorption of the surfactant on the solid material, surfactant is withdrawn from the microemulsion. The composition of the oil-saturated microemulsion a is as follows: 44% by weight water, 44% by weight isooctane, 12% by weight surfactant, the composition of the oil-saturated microemulsion b is: 88.8% by weight water, 1.2% by weight rape seed oil, 6% by weight C12-C16-APG. In order to avoid decomposition, the surfactant has to be kept in excess in the microemulsion. In the embodiment example 25% by weight of the surfactant is adsorbed on the fine grain, which is compensated by adding surfactant to the microemulsion —4% by weight surfactant in relation to the total weight of the microemulsion a.

After separation from the cleansed solid material, the pollutant-containing microemulsion is converted into a surfactant-rich and pollutant-containing phase by lowering the temperature to 10° C. The proportion by volume of the pollutant containing phase at this temperature represents approximately 74% by volume. The pyrene concentration in this phase amounts to approximately 1.2 times the initial concentration in the microemulsion at 25° C. After creaming the emulsion, the oil phase can be separated through decantation. The phase separation can be assisted by centrifuging. This way 43% by weight of the solid-material contamination was extracted and separated. The very high proportion by volume of the organic phase in the microemulsion, existing in the embodiment example, is based on the good oil-solubility of the used surfactant.

The pyrene concentration in the surfactant-rich phase of the microemulsion a after the phase separation was decreased to approximately 50% of the concentration of pyrene in microemulsion before phase separation. Therefore after the addition of isooctane and surfactant, the surfactant-rich phase can be again returned to the extraction device. If instead of the surfactant Igepal CA 520 a more water-soluble surfactant, such as alkyl polyglucoside (APG) is used, it is appropriate to compensate the lower separating efficiency to be expected in this case by using vegetable instead of mineral oils, since polycyclic aromatic hydrocarbons dissolve much better in vegetable oils.

The microorganisms used in the embodiment example were obtained from the microflora of a soil contaminated with polycyclic aromatic hydrocarbons. The Flavobacteria indologenes is used in two different populations, namely microorganisms coming from polluted soil and microorganisms coming from soil artificially contaminated with fluoranthene and benz[a]pyrene. With both populations it was possible to obtain the decomposition of fluoranthene, whereby due to the oils and surfactants a slow-down of the biological conversion occurs.

In the microorganism reactor the reaction is maintained by supplying a mineral medium, in the embodiment example:

| | |
| --- | --- |
| $(NH_4)_2HPO_4$ | 0.5 g/l |
| $KH_2PO_4$ | 0.25 g/l |
| $MgSO_4 * H_2O$ | 0.05 g/l |
| biomass concentration | 8 to 10 g/l |
| trace elements | 5 ml/l. |

In a reactor system of 2.5 l total content, 3.5 ml/d rape seed oil and 2.2 ml/d 10% surfactant solution were completely degraded at a supply of 1640 ml/d mineral medium.

After the removal of the microemulsion, the solid materials cleansed of pollutants are rinsed with wash water for the removal of adhering oil and surfactant residues, this wash water being discharged into the microorganism reactor in the embodiment example.

Before the cleansed solid material is recovered, an inoculation with soil-adapted microorganisms is provided. Such an inoculation is advantageous, since after the extraction there is no natural soil flora capable of degrading the existing residues of surfactant and oils.

Agitating reactors, extraction columns or in the simplest cases clamps located over a collection basin can be used as extraction devices. Corresponding to the provided extraction device, in given cases the pollutant-contaminated solid materials have to be crushed and disaggregated before they are added to the microemulsion and mixed with it, so that in the extraction device the pollutants can be contacted by the microemulsion.

Depending on the grain size of the extracted solid-material fraction, for the separation of solid materials from the microemulsion filters, vacuum belt filter, chamber filter presses or for instance also centrifuges can be used.

For the reaction of the microorganisms with the pollutant contaminated phase in the microorganism reactor flat-bed reactors, fluidized-bed reactors rotary-drum reactors are appropriate. The subsequent inoculation is suitably performed by mixing cleansed solid materials with biomasses and nutrient solutions or by spraying of nutrient solutions containing biomasses. Finely grained fractions should not be decontaminated in clamps, but preferably in reactors.

As phase-separating devices apparatus relying on gravity separation, such as decanters, settlers or cross-flow separators, can be used. The separation can additionally be assisted by centrifuges, particularly separators.

What is claimed is:

1. A process for decontaminating soil contaminated with an organic pollutant wherein the soil contains grains with a particle size up to 60 microns, which comprises the steps of:
    (a) extracting the organic pollutant from the soil containing grains with the particle size up to 60 microns by mixing a microemulsion which consists essentially of a thermodynamically stable, macroscopically homogeneous and optically transparent mixture of water, vegetable oil as apolar hydrophobic solvent, and an alkyl polyglycoside based on a C12 to C16 alcohol or a C10 to C16 alcohol, an alkyl polyglycol ether or a sorbitan ester as surfactant with the contaminated soil to form a cleaned soil and a pollutant-containing microemulsion wherein the organic pollutant is solubilized in the apolar hydrophobic solvent;
    (b) separating the cleaned soil from the pollutant-containing microemulsion; and
    (c) phase-separating the pollutant-containing microemulsion into a surfactant-rich phase containing the surfactant and water and a pollutant-containing phase containing the organic pollutant solubilized in the apolar hydrophobic solvent.

2. A process for decontaminating soil contaminated with a polycyclic aromatic hydrocarbon as an organic pollutant wherein the soil contains grains with a particle size of up to 60 microns, which comprises the steps of:
    (a) extracting the organic pollutant from the soil containing grains with the particle size up to 60 microns by mixing a microemulsion which consists essentially of a thermodynamically stable, macroscopically homogeneous and optically transparent mixture of water, vegetable oil as apolar hydrophobic solvent, and an alkyl polyglycoside based on a C12 to C16 alcohol or a C10 to C16 alcohol, an alkyl polyglycol ether or a sorbitan ester as surfactant with the contaminated soil to form a cleaned soil and a pollutant-containing microemulsion wherein the organic pollutant is solubilized in the apolar hydrophobic solvent;
    (b) separating the cleaned soil from the pollutant-containing microemulsion;
    (c) phase-separating the pollutant-containing microemulsion into a surfactant-rich phase containing the surfactant and water and a pollutant-containing phase containing the polycyclic aromatic hydrocarbon solubilized in the apolar hydrophobic solvent;
    (d) following step (c), introducing microorganisms in a water-rich rinsing solution into the pollutant-containing phase to decompose the polycyclic aromatic hydrocarbon and to form pollutant-free water;
    (e) evacuating the pollutant-free water from the decomposed polycyclic aromatic hydrocarbon; and
    (f) rinsing the cleaned soil obtained in step (b) with water to remove any microemulsion residue to form rinsed cleaned soil and a water-rich rinsing solution containing said microemulsion residue, separating the rinsed soil from the water-rich rinsing solution, and feeding the water-rich rinsing solution to the pollutant-containing phase into which the microorganisms have been introduced according to step (d).

3. The process defined in claim 2 wherein according to step (c) the surfactant-rich phase separated from the pollutant-containing microemulsion is reused in the extraction of the polycyclic aromatic hydrocarbon from the soil according to step (a).

4. The process defined in claim 2 wherein according to step (a) the microemulsion is biologically degradable.

5. The process defined in claim 2 wherein according to step (f) the microemulsion residue is biodegradable.

6. The process defined in claim 2 wherein following step (f) the rinsed cleaned soil separated from the water-rich rinsing solution is inoculated with the same microorganisms used to biologically decompose the polycyclic aromatic hydrocarbon in the pollutant-containing phase according to step (d).

7. The process defined in claim 6 wherein the microorganisms introduced into the pollutant-containing phase in step (d) to decompose the polycyclic aromatic hydrocarbon are also suitable and adapted for the inoculating of the rinsed cleaned soil obtained according to step (f).

8. A process for decontaminating soil contaminated with an organic pollutant wherein the soil contains grains with a particle size up to 60 microns, which comprises the steps of:
    (a) extracting the organic pollutant from the soil containing grains with the particle size up to 60 microns by mixing a microemulsion which consists essentially of a thermodynamically stable, macroscopically homogeneous and optically transparent mixture of water, mineral oil as apolar hydrophobic solvent, and a non-ionic surfactant with the contaminated soil to form a cleaned soil and a pollutant-containing microemulsion wherein the organic pollutant is solubilized in the apolar hydrophobic solvent;
    (b) separating the cleaned soil from the pollutant-containing microemulsion; and
    (c) phase-separating the pollutant-containing microemulsion into a surfactant-rich phase containing the surfactant and water solubilized in a pollutant-containing phase containing the organic pollutant and the apolar hydrophobic solvent.

9. A process for decontaminating soil contaminated with a polycyclic aromatic hydrocarbon wherein the soil contains grains with a particle size of up to 60 microns, which comprises the steps of:

(a) extracting the organic pollutant from the soil containing grains with the particle size up to 60 microns by mixing a microemulsion which consists essentially of a thermodynamically stable, macroscopically homogeneous and optically transparent mixture of water, mineral oil as apolar hydrophobic solvent, and a non-ionic surfactant with the contaminated soil to form a cleaned soil and a pollutant-containing microemulsion wherein the organic pollutant is solubilized in the apolar hydrophobic solvent;

(b) separating the cleaned soil from the pollutant-containing microemulsion;

(c) phase-separating the pollutant-containing microemulsion into a surfactant-rich phase containing the surfactant and water and a pollutant-containing phase containing the polycyclic aromatic hydrocarbon solubilized in the apolar hydrophobic solvent;

(d) following step (c), introducing microorganisms in a water-rich rinsing solution into the pollutant-containing phase to decompose the polycyclic aromatic hydrocarbon and to form pollutant-free water;

(e) evacuating the pollutant-free water from the decomposed polycyclic aromatic hydrocarbon; and (f) rinsing the cleaned soil obtained in step (b) with water to remove any microemulsion residue to form rinsed soil and a water-rich rinsing solution containing said microemulsion residue, separating the rinsed soil from the water-rich rinsing solution, and feeding the water-rich rinsing solution to the pollutant-containing phase into which the microorganisms have been introduced according to step (d).

10. The process defined in claim 9 wherein according to step (c) the surfactant-rich phase separated from the pollutant-containing microemulsion is reused in the extraction of the polycyclic aromatic hydrocarbon from the soil according to step (a).

11. The process defined in claim 9 wherein following step (f) the rinsed soil separated from the water-rich rinsing solution is inoculated with the same microorganisms used to biologically decompose the polycyclic aromatic hydrocarbon in the pollutant-containing phase according to step (d).

12. The process defined in claim 11 wherein the microorganisms introduced into the pollutant-containing phase in step (d) to decompose the polycyclic aromatic hydrocarbon are also suitable and adapted for the inoculating of the rinsed soil obtained according to step (f).

13. The process defined in claim 9 wherein according to step (a) the non-ionic surfactant is octylphenol pentamethylene glycol ether.

14. A process for decontaminating soil contaminated with an organic pollutant wherein the soil contains grains with a particle size up to 60 microns, which comprises the steps of:

(a) extracting the organic pollutant from the soil containing grains with the particle size up to 60 microns by mixing a microemulsion which consists essentially of a thermodynamically stable, macroscopically homogeneous and optically transparent mixture of water, rape seed oil methyl ester as apolar hydrophobic solvent, and an alkyl polyglycoside based on a C12 to C16 alcohol or a C10 to C16 alcohol, an alkyl polyglycol ether or a sorbitan ester as surfactant with the contaminated soil to form a cleaned soil and a pollutant-containing microemulsion wherein the organic pollutant is solubilized in the apolar hydrophobic solvent;

(b) separating the cleaned soil from the pollutant-containing microemulsion; and (c) phase-separating the pollutant-containing microemulsion into a surfactant-rich phase containing the surfactant and water and a pollutant-containing phase containing the organic pollutant solubilized in the apolar hydrophobic solvent.

15. A process for decontaminating soil contaminated with a polycyclic aromatic hydrocarbon as an organic pollutant wherein the soil contains grains with a particle size of up to 60 microns, which comprises the steps of:

(a) extracting the organic pollutant from the soil containing grains with the particle size up to 60 microns by mixing a microemulsion which consists essentially of a thermodynamically stable, macroscopically homogeneous and optically transparent mixture of water, rape seed oil methyl ester as apolar hydrophobic solvent, and an alkyl polyglycoside based on a C12 to C16 alcohol or a C10 to C16 alcohol, an alkyl polyglycol ether or a sorbitan ester as surfactant with the contaminated soil to form a cleaned soil and a pollutant-containing microemulsion wherein the organic pollutant is solubilized in the apolar hydrophobic solvent;

(b) separating the cleaned soil from the pollutant-containing microemulsion;

(c) phase-separating the pollutant-containing microemulsion into a surfactant-rich phase containing the surfactant and water and a pollutant-containing phase containing the polycyclic aromatic hydrocarbon solubilized in the apolar hydrophobic solvent;

(d) following step (c), introducing microorganisms in a water-rich rinsing solution into the pollutant-containing phase to decompose the polycyclic aromatic hydrocarbon and to form pollutant-free water;

(e) evacuating the pollutant-free water from the decomposed polycyclic aromatic hydrocarbon; and (f) rinsing the cleaned soil obtained in step (b) with water to remove any microemulsion residue to form rinsed cleaned soil and a water-rich rinsing solution containing said microemulsion residue, separating the rinsed soil from the water-rich rinsing solution, and feeding the water-rich rinsing solution to the pollutant-containing phase into which the microorganisms have been introduced according to step (d).

* * * * *